US008393852B2

(12) United States Patent  (10) Patent No.: US 8,393,852 B2
Kaufmann et al.  (45) Date of Patent: Mar. 12, 2013

(54) TURBOCHARGER HAVING A DEVICE FOR DETECTING A MALFUNCTION OF THE TURBOCHARGER AND A METHOD FOR DETECTING SUCH A MALFUNCTION

(75) Inventors: Andre Kaufmann, Tegernheim (DE); Achim Koch, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 687 days.

(21) Appl. No.: 12/596,024

(22) PCT Filed: Feb. 27, 2008

(86) PCT No.: PCT/EP2008/052359
§ 371 (c)(1),
(2), (4) Date: Oct. 15, 2009

(87) PCT Pub. No.: WO2008/125383
PCT Pub. Date: Oct. 23, 2008

(65) Prior Publication Data
US 2010/0135773 A1  Jun. 3, 2010

(30) Foreign Application Priority Data
Apr. 16, 2007 (DE) .......................... 10 2007 017 823

(51) Int. Cl.
F01D 25/00 (2006.01)
(52) U.S. Cl. ................ 415/30; 415/1; 415/118; 415/35; 415/61
(58) Field of Classification Search .................. 415/118, 415/1, 30; 416/35, 44, 61
See application file for complete search history.

(56) References Cited

U.S. PATENT DOCUMENTS

| 4,334,427 | A  | * | 6/1982 | Armstrong | ................. 73/114.77 |
| 6,240,343 | B1 | * | 5/2001 | Sarangapani et al. | ........ 701/29.1 |
| 6,250,145 | B1 |   | 6/2001 | Honold et al. | |
| 6,298,718 | B1 |   | 10/2001 | Wang | |
| 2003/0216856 | A1 | * | 11/2003 | Jacobson | ....................... 701/114 |
| 2006/0037316 | A1 | * | 2/2006 | Richey | ............................ 60/601 |
| 2007/0079613 | A1 | * | 4/2007 | Greentree | ....................... 60/602 |

FOREIGN PATENT DOCUMENTS

DE 19837834 A1 2/2000
DE 19804466 C2 4/2000
(Continued)

OTHER PUBLICATIONS

Rautenberg, M., "Aufladung von Verbrennungs-Motoren", Fortschritte der Fahrzeugtechnik, 4 pags, 1990.
Watson, N., "Turbocharging the Internal Combustion Engine", Reader in Mechanical Engineering, Imperial College, London; 3 pages, 1982.

(Continued)

Primary Examiner — Ninh H Nguyen
(74) Attorney, Agent, or Firm — King & Spalding L.L.P.

(57) ABSTRACT

The turbocharger having a device for detecting a malfunction of the turbocharger, particularly a malfunction of at least one bearing of the turbocharger has the following features: The device for detecting a malfunction of the turbocharger has a memory device, in which the target operating states of an intact turbocharger are stored. The device for detecting a malfunction of the turbocharger further has a comparing device, in which the determined actual operating state of the turbocharger is compared to a corresponding target operating state of an intact turbocharger. The turbocharger further has a measuring device for determining an actual operating state of the turbocharger, wherein the device for detecting a malfunction of the turbocharger emits an error message if the comparing device detects that the actual operating stage deviates from the target operating state by a predefined measure.

14 Claims, 2 Drawing Sheets

FOREIGN PATENT DOCUMENTS

| | | | |
|---|---|---|---|
| DE | 10134543 | A1 | 2/2003 |
| DE | 10202111 | A1 | 7/2003 |
| DE | 10333171 | A1 | 2/2005 |
| DE | 102005012946 | A1 | 9/2006 |
| GB | 2052070 | A | 1/1981 |
| GB | 2345941 | A | 7/2000 |
| JP | 2002332864 | A | 11/2002 |
| WO | WO01/29386 | A1 | 4/2001 |

OTHER PUBLICATIONS

German Office Action, German application No. 10 2007 017 823.0-13, 4 pages, Dec. 6, 2007.
German Office Action, German application No. 10 2007 017 823.0-13, 4 pages, Jul. 16, 2009.
International PCT Search Report, PCT/EP2008/052359, 10 pages, Mailed Jun. 18, 2008.

* cited by examiner

TURBOCHARGER HAVING A DEVICE FOR DETECTING A MALFUNCTION OF THE TURBOCHARGER AND A METHOD FOR DETECTING SUCH A MALFUNCTION

CROSS-REFERENCE TO RELATED APPLICATIONS

This application is a U.S. National Stage Application of International Application No. PCT/EP2008/052359 filed Feb. 27, 2008, which designates the United States of America, and claims priority to German Application No. 10 2007 017 823.0 filed Apr. 16, 2007, the contents of which are hereby incorporated by reference in their entirety.

TECHNICAL FIELD

The invention relates to a turbocharger having a device for detecting a malfunction of the turbocharger, in particular a malfunction of at least one bearing of the turbocharger as well as a method for detecting such a malfunction.

BACKGROUND

In general, turbochargers serve to improve the degree of efficiency of a combustion engine and thereby increase its output. In such cases they feature a shaft that pivots in a housing of the turbocharger around a longitudinal axis and on which is arranged a turbine wheel and a compressor wheel. In this arrangement the shaft is supported to allow it to rotate by means of two radial bearings. Essentially, provision is normally made for at least one axial bearing because the exhaust gas flow impinging upon the turbine wheel produces strong axial forces that must be absorbed by means of the axial bearing.

The turbine wheel is driven by means of the exhaust gas flow of the internal combustion engine, with the compressor wheel also driven being driven here by means of the shaft. Air from the outside is compressed by means of the compressor wheel and is fed with a corresponding pressure to the cylinders of the internal combustion engine.

As a result, high demands are imposed on the support of the shaft of the exhaust gas turbocharger. The underlying reason for this is that the shaft can normally achieve very high rotational speeds of for example up to 300,000 revolutions per minute. Because of the high rotational speeds, the rotating parts of the exhaust gas turbocharger must be balanced very accurately so that as little vibration as possible is produced. In addition, the turbocharger and its bearings are subjected to high temperatures, for example by the hot exhaust gas.

A part of the damage to the axial bearings and the radial bearings is caused by the delay in the oil supply to the turbocharger after a very quick starting of the engine under cold environmental conditions.

Friction or roller bearings are used for example as bearings for the shafts. These are however subjected to considerable wear in relation to the previously described loads. The bearings and their lubrication are responsible for the majority of failures of turbochargers.

SUMMARY

According to various embodiments, a turbocharger can be created with a device for detecting a malfunction of a bearing by means of which a malfunction of a bearing can be determined in an easy manner. According to various further embodiments, a corresponding method for detecting a malfunction of a bearing of a turbocharger can be provided.

According to an embodiment, a turbocharger may comprise a device for detecting a malfunction of the turbocharger, in particular a malfunction of at least one bearing of the turbocharger, a) with the device for detecting a malfunction of the turbocharger comprising a memory device in which the desired rotational speed curves of an intact turbocharger are stored, b) with the device for detecting a malfunction of the turbocharger comprising a comparing device in which the detected actual rotational speed curve of the turbocharger is compared to a corresponding desired rotational speed curve of an intact turbocharger, c) with the turbocharger comprising a measuring device for determining an actual rotational speed curve of the turbocharger, and d) with the device for detecting a malfunction of the turbocharger issuing an error message if the comparing device detects that the actual rotating speed reaches a limit rotational speed within a period of time and the period of time in this process lies outside a tolerance range for a desired period of time, within which an intact turbocharger reaches the limit rotational speed.

According to another embodiment, a turbocharger may have a device for detecting a malfunction of the turbocharger, in particular a malfunction of at least one bearing of the turbocharger, a) with the device for detecting a malfunction of the turbocharger comprising a memory device, in which the desired rotational speed curves of an intact turbocharger are stored as a function of a mass flow of the exhaust gas for different engine oil temperatures and/or exhaust gas temperatures, b) with the device for detecting a malfunction of the turbocharger further comprising a comparing device, in which a detected actual rotational speed curve is compared to the corresponding desired rotational speed curve of an intact turbocharger, with the comparing device selecting the desired rotational speed curve of the intact turbocharger as a function of a determined engine oil temperature and/or the exhaust gas temperature or an engine oil temperature or exhaust gas temperature which can be compared to the determined engine oil temperature or the exhaust gas temperature, c) with the turbocharger further comprising a measuring device for determining an actual rotational speed curve of the turbocharger as a function of a mass flow of the exhaust gas and for determining the engine oil temperature and/or the exhaust gas temperature of the turbocharger, and d) with the device for detecting a malfunction of the turbocharger issuing an error message if the comparing device detects that the actual rotational speed as a function of the mass flow of the exhaust gas lies outside a tolerance range of the desired rotational speed of an intact turbocharger.

According to a further embodiment, the measuring device can be embodied in such a way that it determines an actual rotational speed curve of the turbocharger as a function of the time and an engine oil temperature. According to a further embodiment, the memory device of the desired rotational speed curves of an intact turbocharger can be stored as a function of the time for different engine oil temperatures and the comparing device selects a desired rotational speed curve of the intact turbocharger as a function of the determined engine oil temperature or an engine oil temperature which can be compared to the determined engine oil temperature. According to a further embodiment, the device for detecting a malfunction of the turbocharger may emit an error message to the driver that at least one bearing of the turbocharger indicates a malfunction if the comparing device detects that the actual rotational speed as a function of the mass flow of the exhaust gas lies outside a tolerance range of the desired rotational speed of an intact turbocharger. According to a further embodiment, the measuring device may determine the rotational speed of the exhaust gas turbocharger by means of at least one rotational speed sensor. According to a further embodiment, the rotational speed sensor may be for example an eddy current sensor, with the eddy current sensor determines the rotational speed of the turbocharger by measuring eddy currents at the vanes of the turbine wheels and/or the compressor wheels and/or by measuring the eddy current of a magnetic screw which is arranged on a shaft of the turbocharger and/or by measuring the eddy current of a toothed flange of the shaft. According to a further embodiment, the engine oil temperature can be determined from an engine oil temperature model of an engine control device and/or by means of at least one temperature sensor arranged in a corresponding manner. According to a further embodiment, the measuring device may determine the exhaust gas temperature from an exhaust gas temperature model of an engine control and/or by means of at least one temperature sensor arranged in the turbocharger in a corresponding manner.

According to yet another embodiment, a method for detecting a malfunction of a turbocharger, in particular a malfunction of at least one bearing of the turbocharger, may comprise the steps: a) Determining a desired rotational speed curve of an intact turbocharger, b) Measuring the actual rotational speed curve of the turbocharger, c) Comparing the actual rotational speed curve of the turbocharger to a corresponding desired rotational speed curve of the intact turbocharger, d) Detecting a malfunction of the turbocharger if die actual rotational speed reaches a limit rotational speed within a period of time and the period of time in this process lies outside a tolerance range for a desired period of time, within which an intact turbocharger with intact bearings reaches the limit rotational speed.

According to yet another embodiment, a method for detecting a malfunction of a turbocharger, in particular a malfunction of at least one bearing of the turbocharger, may comprise the steps: a) Determining desired rotational speed curves as a function of a mass flow of the exhaust gas of an intact turbocharger for different engine oil temperatures and/or exhaust gas temperatures, b) Determining the actual rotational speed curve of the turbocharger as a function of a mass flow of the exhaust gas and determining the engine oil temperature and/or the exhaust gas temperature, c) Comparing the detected actual rotational speed curve to the corresponding desired rotational speed curve of the intact turbocharger, with the desired rotational speed curve of the intact turbocharger is selected as a function of the determined engine oil temperature and/or the exhaust gas temperature or of an engine oil temperature or exhaust gas temperature which can be compared to the determined engine oil temperature or the exhaust gas temperature, d) Detecting a malfunction of the turbocharger if the actual rotational speed as a function of the mass flow of the exhaust gas lies outside a tolerance range of the desired rotational speed of an intact turbocharger.

According to a further embodiment, the method may comprise the steps of a1) Determining desired rotational speed curves of an intact turbocharger as a function of the time for different engine oil temperatures, b1) Determining the actual rotational speed curve of the turbocharger as a function of the time and determining the engine oil temperature, c1) Selecting the desired rotational speed curve as a function of the determined engine oil temperature, c2) Comparing the determined actual rotational speed curve to the corresponding desired rotational speed curve of the intact turbocharger, and d1) Detecting a malfunction of the turbocharger if the measured actual rotational speed curve deviates from the desired rotational speed curve by a predefined measure. According to a further embodiment, the desired rotational speed or the actual rotational speed can be determined for an idle phase of the engine. According to a further embodiment, the desired rotational speed curve or the actual rotational speed curve can be determined for a slowing-down phase of the engine if the engine has been switched off. According to a further embodiment, the desired rotational speed curve or the actual rotational speed curve as a function of a mass flow of the exhaust gas can be determined for a phase after the engine has been switched over to an overrun fuel cut-off operation.

BRIEF DESCRIPTION OF THE DRAWINGS

The invention is described in more detail below with reference to the exemplary embodiments specified in the schematic figures of the drawing, in which.

DETAILED DESCRIPTION

Figure 1:
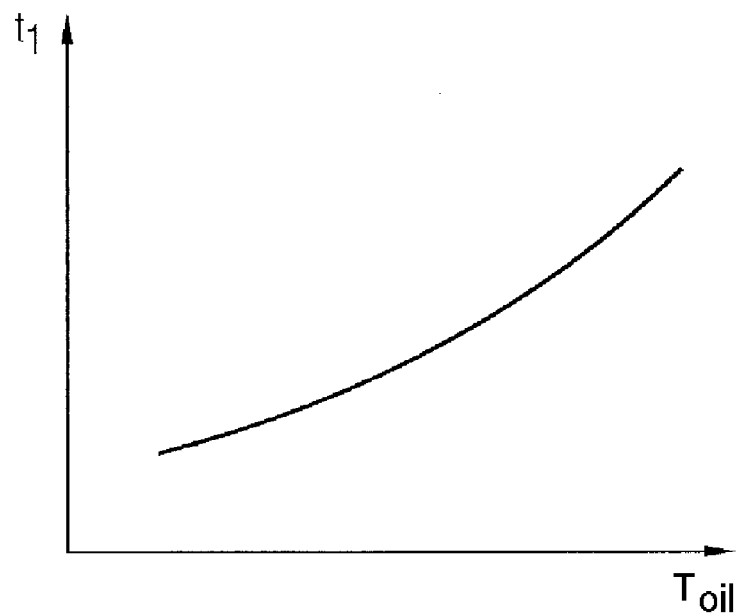
FIG. 1 shows a diagram in which the temperature of the lubricating oil $T_{oil}$ is plotted as a function of the time t during operation.

According to an embodiment, provision is accordingly made for a turbocharger with a device for detecting a malfunction of the turbocharger, in particular a malfunction of at least one bearing of the turbocharger, with the device for detecting a malfunction of the turbocharger featuring a memory device, in which the required operating states of an intact turbocharger are stored, with the device for detecting a malfunction of the turbocharger also featuring a comparing device, in which the determined actual operating state of the turbocharger is compared to a corresponding required operating state of an intact turbocharger, with the turbocharger also featuring a measuring device for determining an actual operating state of the turbocharger, and with the device for detecting a malfunction of the turbocharger outputting an error message if the comparing device detects that the actual operating state deviates from the desired operating state by a predefined measure.

In addition, in accordance with another embodiment, provision is made for a method for detecting a malfunction of a turbocharger, in particular a malfunction of at least one bearing of the turbocharger, with the following steps:

determining a desired operating state of an intact turbocharger, measuring the actual operating state of the turbocharger, comparing the actual operating state of the turbocharger to a corresponding desired operating state of the intact turbocharger, detecting a malfunction of the turbocharger if its actual operating state deviates from the desired operating state by a predefined measure.

In this process, the device and the method have the advantage that by comparing a desired operating state of a turbocharger with intact bearings to an actual operating state of a turbocharger it can be detected very easily whether the turbocharger under examination has intact bearings or whether these have possibly been damaged. This enables an indication to be provided at an early stage to a driver of a vehicle that a bearing of the turbocharger is defective before the engine of the vehicle is damaged.

In accordance with an embodiment, the measuring device is embodied in such a way that it determines an actual rotational speed curve of the turbocharger as a function of the time and an engine oil temperature. Because the rotational speed curve of a turbocharger also depends on the engine oil temperature and as a result on the viscosity of the oil, it is possible that by comparing the actual rotational speed curve to the desired rotational speed curve if the engine oil temperatures are the same or essentially similar engine oil temperatures, a malfunction of the turbocharger can be determined in a reliable manner.

In a further embodiment, the device for detecting a malfunction of the turbocharger issues an error message to the driver that at least one bearing of the turbocharger is malfunctioning when the actual rotational speed reaches a limit rotational speed within a period of time and in this process the period of time lies outside a tolerance range for a desired period of time. This for example has the advantage that if the slowing-down phase of an engine is observed after the engine has been switched off, there are no longer any gas movements, but the decrease in the rotational speed of the turbocharger depends essentially only on the friction of the bearing. In this process, a defective bearing causes a very quick drop in the rotational speed as compared with that of a turbocharger with intact bearings. It can likewise be detected in this way in a reliable manner when a bearing is malfunctioning. In a further embodiment, the measuring device is embodied in such a way that it determines an actual rotational speed curve of the turbocharger as a function of a mass flow of the exhaust gas and an engine oil temperature and/or an exhaust gas temperature. The engine oil temperature influences the friction of the bearing on the basis of the viscosity of the oil and with that the rotational speed and the same applies to the exhaust gas temperature. By comparing an actual curve to a desired curve both of which apply to the same engine oil temperature and/or exhaust gas temperature, it is likewise possible to detect a malfunction of a bearing of the turbocharger in a very reliable manner.

In another embodiment, the measuring device for determining an actual operating state, determines the rotational speed of the exhaust gas turbocharger by means of at least one rotational speed sensor. In this case, the rotational speed sensor is preferably an eddy-current sensor. In this case, in order to determine the rotational speed, the eddy-current sensor can measure the eddy currents at the vanes of the turbine wheels and/or the compressor wheels and/or by measuring the eddy current of a magnetic screw which is arranged on a shaft of the turbocharger and/or by measuring the eddy current of a toothed flange of the shaft. In this case, measuring the eddy current by means of a magnetic screw provides the simple and accurate possibility of determining the rotational speed of the turbocharger.

In accordance with a further embodiment, the measuring device takes the engine oil temperature from an engine oil temperature model of an engine control device in order to determine an actual operating state. This has the advantage that for example already available measuring values can be used without an additional temperature sensor being necessary.

In another embodiment, the measuring device for determining an actual operating state determines the exhaust gas temperature from an exhaust gas temperature model of an engine control device. This has, as shown already with regard to determining the engine oil temperature, the advantage that already available measuring values can be used.

In order to determine a malfunction of the turbocharger, provision has been made for a device for detecting a malfunction (not shown), which has a memory device for storing the desired curves for the different operating states and a comparing device, in which an actual curve or actual values of a turbocharger are compared to a corresponding desired curve or desired values of an intact turbocharger. Should a significant deviation be detected, then the device of the turbocharger for detecting a malfunction issues an error message to the driver, for example by the flashing of a corresponding control light in the display of the vehicle. In this process, the device of the turbocharger for detecting a malfunction and its memory device and comparing device can be embodied as part of the engine control device or be connected to it. A measuring device for determining different parameters for different operating states, such as for example the rotational speed of the exhaust gas turbocharger, can likewise be connected to the engine control device or be embodied as part thereof.

In general, a turbocharger as has already been described with reference to the prior art can at least have one radial bearing and/or one axial bearing. It is however also feasible that one, two or a plurality of cone bearings can be used and thus no separate radial bearing and axial bearings need be present. As a result, provision can also be made for cone bearings in addition to or as an alternative to radial bearings and/or axial bearings depending on the function and the purpose.

The failure of the turbocharger because of a bearing may lead to damage to the engine of the vehicle. A diagnosis of the condition of the bearing may lead in the case of a bearing defect to a request for a workshop visit. Because of this early detection, damage to the engine can thus be prevented.

At a few operating points, such as for example after switching over to a cut-off switching or after switching off the engine or in idle, general conditions of the turbocharger are known. In idle, the rotational speed of the supercharger can, in this process, also be compared without time gradients and only to a desired value as a function of the oil temperature. However, in principle a comparison as a function of a time gradient to the desired values is also possible in this case. In the above-mentioned cases, the turbine wheel or the compressor wheel is braked from its rotational speed prior to that point by aerodynamic effects and the friction of the bearing.

The change in the rotational speed can be determined by means of a measuring device, which for example has a corresponding rotational speed sensor, which will be described in more detail below.

The change in the actual rotational speed is now compared to a change in the desired rotational speed, which was stored beforehand in the memory device. In this process, the change in the desired rotational speed is the decrease in the rotational speed or the change in the rotational speed of a turbocharger with intact bearings.

If the comparing device detects that the detected change in the actual rotational speed deviates from the change in the desired rotational speed, then there is a malfunction of the bearing in said case. For this kind of diagnosis, as described previously, at least one rotational speed sensor can be used at the exhaust gas turbocharger for example.

In accordance with various embodiments the available information about the change in the rotational speed will be used while utilizing a rotational speed sensor in order to diagnose the bearing or the bearings of the turbocharger. The additional expense in this case can just include an additional software function in the engine control device.

In an embodiment the slowing-down phase after the engine has been switched off is used in the diagnosis method. In this case there are no gas movements at the turbocharger so that the boundary conditions with regard to the aerodynamics are always the same. The decrease in the rotational speed of the turbocharger over time then depends essentially only on the friction of the bearing. The friction of the bearing for its part depends on the oil temperature. If these boundary parameters are well known, then an average change in the rotational speed can be determined. If the measured change in the rotational speed deviates from the change in the rotational speed that was determined beforehand by a predefined measure, then a bearing of the turbocharger is defective. In order to take into account deviations in the friction of the bearing in production, it is in addition possible to learn a change in the desired rotational speed.

In another embodiment of the diagnosis method it is also possible to detect, in the case of operating points with fixed boundary conditions, for example in the case of a switching over to the overrun operation, whether or not there is a malfunction of a bearing of the turbocharger.

FIG. 1 shows a diagram in which the temperature of the engine oil $T_{oil}$ for lubricating the bearing of the turbocharger in accordance with an embodiment is plotted as a function of the time $t_1$. In this process the engine oil temperature $T_{oil}$ increases over time as the engine is running.

In this process the engine oil temperature $T_{oil}$ can be measured by means of the engine control device (EMS), for example by means of a corresponding sensor or by means of sensors. As an alternative, the engine oil temperature can also for example be taken from a model for the engine oil temperature from the engine control device. These possibilities for determining the engine oil temperature $T_{oil}$ by means of a corresponding measuring device are only by way of example and the invention is not limited thereto.

The speed at which the rotational speed of the turbocharger decreases for example after the vehicle has been switched off in this case also depends on the engine oil temperature $T_{oil}$. Thus the rotational speed of the turbocharger, after the vehicle has been switched off, when the engine has been switched off at an engine oil temperature $T_{oil}$ of for example 20° C. decreases much faster than is the case at an engine oil temperature of for example 80° C. because the engine oil at 80° C. is less viscous and for this reason is lighter than at 20° C.

For that reason, it is sensible to take the engine oil temperature $T_{oil}$ into account when an actual change in the rotational speed of a turbocharger is to be compared to a change in the desired rotational speed of a turbocharger with intact bearings.

Figure 2:
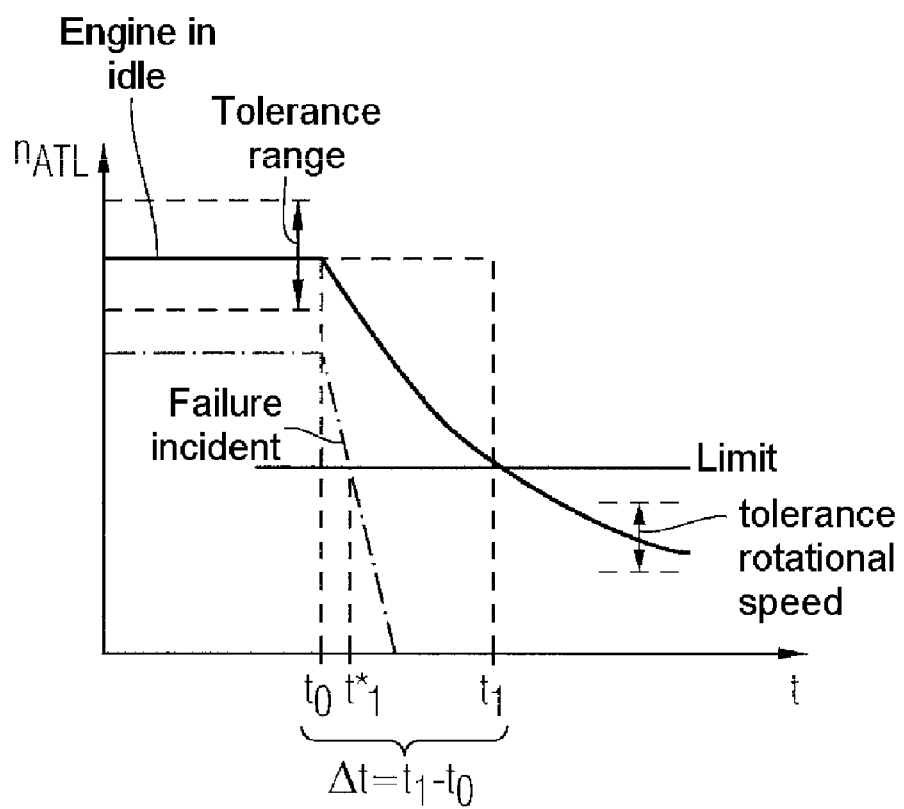
FIG. 2 shows a diagram in which the rotational speed of the turbocharger $n_{ATL}$ is plotted as a function of the time t.

FIG. 2 shows a diagram in which the rotational speed of the turbocharger $n_{ATL}$ is plotted as a function of the time t.

In this diagram, a desired curve is plotted by means of a solid line by means of which the curve of the rotational speed $n_{ATL}$ is shown as a function of the time t in an engine with a turbocharger in which the bearings are intact. In this case, the desired curve is selected by the comparing device as a function of the engine oil temperature $T_{oil}$ of the turbocharger to be examined. As has been described previously, the curve of the desired curve varies depending on the engine oil temperature $T_{oil}$, i.e. the rotational speed for example decreases faster in the desired curve when the engine oil temperature $T_{oil}$ is low (for example 20° C.), because the engine oil then has a higher viscosity and is thus more viscous.

This means that in accordance with the engine oil temperature $T_{oil}$, measured at the turbocharger to be examined, a corresponding, matching desired curve of an intact turbocharger is selected from the memory device. In this case, the desired curve was plotted for the same or a comparable engine oil temperature $T_{oil}$.

As can be seen from the diagram in FIG. 2, the engine then runs in idle at a specific rotational speed. The rotational speed can vary in this case within a predefined tolerance range which is plotted by means of the broken lines, without a malfunction being present.

At the point in time $t_0$, the engine is switched off and the slowing-down phase of the engine begins. After the engine has been switched off, there no longer are any gas movements at the turbocharger, so that the boundary conditions with respect to the aerodynamics are still the same. In this case, the decrease in the rotational speed $n_{ATL}$ of the turbocharger essentially depends only on the friction of the bearing, so that from the rotational speed conclusions can be drawn about the friction of the bearing and therefore about the condition of the bearings of the turbocharger.

In accordance with various embodiments, desired curves are preferably plotted for the operating states such as for example the slowing-down phase of the engine, in which parameters, such as the rotational speed or the friction of the bearing, can be determined directly or indirectly and in this case allows conclusions about the condition of the bearings of the turbocharger. The desired values of the parameters are then compared to corresponding actual values.

In the present case, the rotational speed $n_{ATL}$ of the turbocharger decreases gradually as the time t increases. In this case the rotational speed $n_{ATL}$ of the turbocharger reaches a predefined limit rotational speed $n_{limit}$ after a time $t_1$. In this case, the change in the rotational speed is determined for the period of time $\Delta t = t_1 - t_0$.

The curve of the rotational speed $n_{ATL}$ of the turbocharger, when the latter is defective, i.e. when one bearing or a number of bearings are malfunctioning, is plotted by means of a dash-and-dot line. In this process, the rotational speed $n_{ATL}$ of the turbocharger is in idle below the tolerance range of an intact turbocharger. Over and above that, the rotational speed $n_{ATL}$ of the turbocharger drops rapidly to a point in time $t_0$ after the engine has been switched off and reaches the predefined limit rotational speed $n_{limit}$ at a time $t_{1*}$. This is for example the case when the friction of the bearing is very high because of a malfunction of the bearing.

Because the time $t_{1*}$ is less than the predefined threshold value $t_1$ or the time interval $\Delta t^* = t_{1*} - t_0$ in which the rotational speed of the examined turbocharger drops is smaller than the time interval $\Delta t = t_1 - t_0$ of the intact turbocharger, the examined turbocharger or its bearing is malfunctioning.

In this case, the device for detecting a malfunction of the turbocharger can output a message to the driver of the vehicle that a bearing of the turbocharger is no longer functioning correctly. This has the advantage that a driver can take the vehicle to a workshop at an early stage before the engine is damaged and consequently a driver can save on considerable repair costs.

In addition to the slowing-down phase after the engine has been switched off, the engine and the turbocharger can also be examined while it is running after switching over to the overrun fuel cut-off operation. In this process, the overrun fuel cut-off operation is when the vehicle hesitates. In this process, the accelerator is not activated and the rotational speed of the engine lies above a predefined threshold value of for example 1,000 to 1,200 revolutions per minute.

Figure 3:
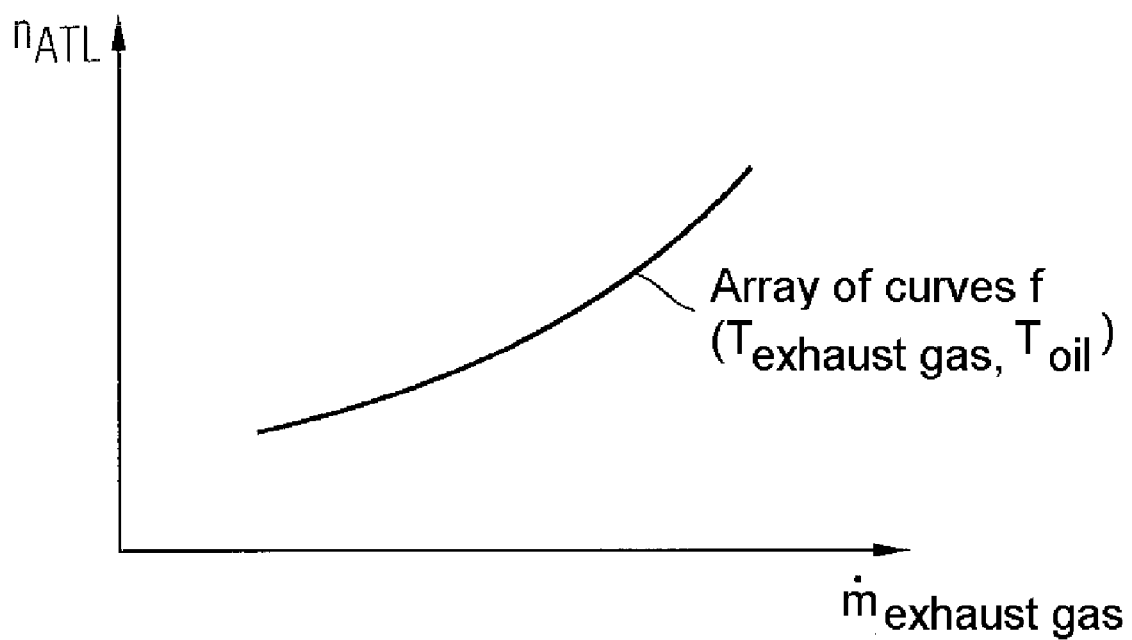
FIG. 3 shows a diagram in which the rotational speed of the turbocharger $n_{ATL}$ is plotted as a function of the mass flow of the exhaust gas $\dot{m}_{exhaust\ gas}$.

FIG. 3 shows a diagram by means of which the rotational speed $n_{ATL}$ of the turbocharger is plotted as a function of the mass flow of the exhaust gas $\dot{m}_{exhaust\ gas}$.

The diagram is plotted for example for operation in the case of overrun fuel cut-off operation, with the diagram being purely schematic and not according to scale.

In the diagram, the exhaust gas temperature $T_{exhaust\,gas}$ and the temperature of the engine oil $T_{oil}$ are taken into account and plotted according to an array of curves f. The temperature of the engine oil $T_{oil}$ and for this reason the viscosity of the oil, leads to a corresponding friction of the bearing of the turbocharger to be lubricated. According to this, the exhaust gas temperature $T_{exhaust\,gas}$ and the engine oil temperature $T_{oil}$ influence the increase of the rotational speed of the exhaust gas turbocharger $n_{ATL}$ as a function of the mass flow of the exhaust gas $\dot{m}_{exhaust\,gas}$. In this process, the temperature of the exhaust gas $T_{exhaust\,gas}$ can for example be determined by means of a corresponding temperature sensor or temperature sensors or from an exhaust gas temperature model.

A malfunction of the examined turbocharger is then detected by means of the device for detecting a malfunction of the turbocharger when for example the friction of the bearing of the examined turbocharger is clearly higher compared to the friction of a turbocharger with intact bearings. As a result, the rotational speed of the turbocharger $n_{ATL}$ is lower than the rotational speed of a turbocharger with intact bearings or increases less with an increasing mass flow of the exhaust gas $\dot{m}_{exhaust\,gas}$ and as a result, it is below the corresponding desired curve of the turbocharger with intact bearings.

In this case, a message can likewise be output to the driver that at least one of the bearings of the turbocharger of a vehicle is defective.

In order to determine the rotational speed $n_{ATL}$ of the exhaust gas turbocharger in FIG. 3, a rotational speed sensor is provided as a measuring device at the exhaust gas turbocharger. In this case, the rotational speed sensor can for example be an eddy-current sensor, which determines the rotational speed of the turbocharger by measuring the eddy currents at the vanes of the turbine wheel or the compressor wheel.

As an alternative, provision can preferably also be made for an eddy current sensor which determines the rotational speed of the turbocharger by measuring the eddy current of a magnetic screw which is provided on the shaft or is connected to a part which is attached to the shaft in order to rotate along with it. Optionally, provision can also be made for an eddy-current sensor, which determines the rotational speed of the turbocharger by measuring the eddy currents of the toothed flange at the shaft. However, these are only a few examples of rotational speed sensors. The list is not complete. Instead of eddy-current sensors, other sensors can also be used as a measuring device in order to determine the rotational speed of the turbocharger.

In a further embodiment, the idle operation is used as the operating point in order to detect whether or not a bearing of a turbocharger is malfunctioning. Modern engines have an electronic idle rotational speed control. Therefore, in idle a comparable operating point is always available in which the rotational speed of the exhaust gas turbocharger can be determined.

In this embodiment, desired values are for example plotted beforehand for the rotational speed of the exhaust gas turbocharger in idle over the time as a function of different engine oil temperatures $T_{oil}$. As was already described in detail previously, the engine oil temperature $T_{oil}$ also influences the rotational speed curve. These desired values are stored or saved beforehand in the memory device. The actual engine oil temperature is now determined in idle for the time being and, essentially, an actual rotational speed or an actual rotational speed curve of the exhaust gas turbocharger over the time is determined. In this case, a corresponding desired curve is selected as a function of the actual engine oil temperature, which corresponds to the actual engine oil temperature. Should it be detected in this process that the actual values or the actual curve deviates from the desired curve by a predefined measure, it can thus be concluded that at least one bearing of the exhaust gas turbocharger is malfunctioning.

Although the present invention was described above on the basis of the preferred exemplary embodiments, they are not limited to that, but may be modified in many ways. In principle, the individual embodiments can also be combined with one another, in particular their individual characteristics.

What is claimed is:

1. A device for detecting a malfunction of a turbocharger, in particular a malfunction of at least one bearing of the turbocharger, the device comprising:
   a) a memory device in which desired rotational speed curves showing rotational speed as a function of time and engine oil temperature of an intact turbocharger switching over to an overrun operation are stored,
   b) a comparing device in which a detected actual rotational speed curve of the turbocharger upon switching over to an overrun operation is compared to a corresponding desired rotational speed curve of an intact turbocharger switching over to an overrun operation,
   c) a measuring device for detecting the actual rotational speed curve of the turbocharger upon switching over to an overrun operation, and wherein
   d) the comparing device operable for detecting a malfunction of the turbocharger and issuing an error message if the comparing device detects that the actual rotating speed reaches a limit rotational speed within a period of time and the period of time in this process lies outside a tolerance range for a desired period of time, within which an intact turbocharger reaches the limit rotational speed.

2. The turbocharger according to claim 1, further comprising a gauge which measures an actual engine oil temperature.

3. The turbocharger according to claim 2, wherein:
   the desired rotational speed curves of an intact turbocharger are stored as a function of the time for different engine oil temperatures; and
   the comparing device selects a desired rotational speed curve of the intact turbocharger as a function of the measured engine oil temperature.

4. The turbocharger according to claim 2, wherein the engine oil temperature is determined from an engine oil temperature model of an engine control device and/or by means of at least one temperature sensor arranged in a corresponding manner.

5. The turbocharger according to claim 4, wherein the measuring device determines the exhaust gas temperature from an exhaust gas temperature model of an engine control and/or by means of at least one temperature sensor arranged in the turbocharger in a corresponding manner.

6. The turbocharger according to claim 1, wherein the measuring device determines the rotational speed of the exhaust gas turbocharger by means of at least one rotational speed sensor.

7. The turbocharger according to claim 6, wherein the rotational speed sensor includes an eddy current sensor, which determines the rotational speed of the turbocharger by measuring eddy currents at the vanes of the turbine wheels or the compressor wheels or by measuring the eddy current of a magnetic screw which is arranged on a shaft of the turbocharger or by measuring the eddy current of a toothed flange of the shaft.

8. A turbocharger having a device for detecting a malfunction of the turbocharger, in particular a malfunction of at least one bearing of the turbocharger, wherein
- a) the device for detecting a malfunction of the turbocharger comprises a memory device, in which the desired rotational speed curves of an intact turbocharger switching to an overrun operation are stored as a function of a mass flow of the exhaust gas at various engine oil temperatures or exhaust gas temperatures,
- b) the device for detecting a malfunction of the turbocharger further comprises a comparing device, in which a detected actual rotational speed curve of the turbocharger upon switching to an overrun operation is compared to the corresponding desired rotational speed curve of an intact turbocharger switching to an overrun operation, with the comparing device selecting the desired rotational speed curve of the intact turbocharger as a function of a determined engine oil temperature the exhaust gas temperature or an engine oil temperature or exhaust gas temperature which can be compared to the determined engine oil temperature or the exhaust gas temperature,
- c) the turbocharger further comprising a measuring device for determining an actual rotational speed curve of the turbocharger upon switching to an overrun operation as a function of a mass flow of the exhaust gas and for determining the engine oil temperature and/or the exhaust gas temperature of the turbocharger, and wherein
- d) the device for detecting a malfunction of the turbocharger issuing an error message if the comparing device detects that the actual rotational speed as a function of the mass flow of the exhaust gas lies outside a tolerance range of the desired rotational speed of an intact turbocharger.

9. The turbocharger according to claim 8, wherein the device for detecting a malfunction of the turbocharger emits an error message that at least one bearing of the turbocharger indicates a malfunction if the comparing device detects that the actual rotational speed as a function of the mass flow of the exhaust gas lies outside a tolerance range of the desired rotational speed of an intact turbocharger.

10. The turbocharger according to claim 8, wherein the engine oil temperature is determined from an engine oil temperature model of an engine control device or by means of at least one temperature sensor arranged in a corresponding manner.

11. The turbocharger according to claim 8, wherein the measuring device determines the exhaust gas temperature from an exhaust gas temperature model of an engine control or by means of at least one temperature sensor arranged in the turbocharger in a corresponding manner.

12. A method for detecting a malfunction of a turbocharger, in particular a malfunction of at least one bearing of the turbocharger, comprising the steps:
- a) Determining a desired rotational speed curve of an intact turbocharger switching to an overrun operation based at least in part on an actual engine oil temperature,
- b) Measuring the actual rotational speed curve of the turbocharger upon switching to an overrun operation,
- c) Comparing the actual rotational speed curve of the turbocharger to the corresponding desired rotational speed curve of the intact turbocharger,
- d) Detecting a malfunction of the turbocharger if the actual rotational speed reaches a limit rotational speed within a period of time and the period of time in this process lies outside a tolerance range for a desired period of time, within which an intact turbocharger with intact bearings reaches the limit rotational speed upon switching to an overrun operation.

13. The method according to claim 12, further comprising
- a1) Determining desired rotational speed curves of an intact turbocharger as a function of the time for different engine oil temperatures,
- b1) Determining the actual rotational speed curve of the turbocharger as a function of the time and determining the engine oil temperature,
- c1) Selecting the desired rotational speed curve as a function of the determined engine oil temperature,
- c2) Comparing the determined actual rotational speed curve to the corresponding desired rotational speed curve of the intact turbocharger and
- d1) Detecting a malfunction of the turbocharger if the measured actual rotational speed curve deviates from the desired rotational speed curve by a predefined measure.

14. A method for detecting a malfunction of a turbocharger, in particular a malfunction of at least one bearing of the turbocharger, comprising the steps:
- a) Determining desired rotational speed curves as a function of a mass flow of the exhaust gas of an intact turbocharger upon switching to an overrun operation for different engine oil temperatures or exhaust gas temperatures,
- b) Determining the actual rotational speed curve of the turbocharger upon switching to an overrun operation,
- c) Comparing the detected actual rotational speed curve to the corresponding desired rotational speed curve of the intact turbocharger, with the desired rotational speed curve of the intact turbocharger is selected as a function of the determined engine oil temperature or the exhaust gas temperature or of an engine oil temperature or exhaust gas temperature which can be compared to the determined engine oil temperature or the exhaust gas temperature,
- d) Detecting a malfunction of the turbocharger if the actual rotational speed as a function of the mass flow of the exhaust gas lies outside a tolerance range of the desired rotational speed of an intact turbocharger upon switching to an overrun operation.

* * * * *